United States Patent [19]

Allan

[11] 4,127,544
[45] Nov. 28, 1978

[54] PROCESS FOR THE PARTIAL SUBSTITUTION OF AMMONIUM LIGNOSULFONATE FOR PHENOL IN PHENOLIC-ALDEHYDE RESIN ADHESIVES

[75] Inventor: George G. Allan, Seattle, Wash.

[73] Assignee: Weyerhaeuser Company, Tacoma, Wash.

[21] Appl. No.: 612,388

[22] Filed: Sep. 11, 1975

[51] Int. Cl.$^2$ .................. C08L 97/00; C08G 8/18; C09J 3/28

[52] U.S. Cl. .................. 260/17.5; 156/335; 260/124 R; 428/529; 528/172

[58] Field of Search ............ 260/17.5, 124 R, 124 A, 260/57 C; 156/335; 428/528, 529

[56] References Cited

U.S. PATENT DOCUMENTS

| | | | |
|---|---|---|---|
| 2,794,790 | 6/1957 | Marshall et al. | 260/17.5 |
| 2,849,314 | 8/1958 | Goss | 260/17.5 X |
| 3,597,375 | 8/1971 | Ludwig et al. | 260/17.5 |
| 3,658,638 | 4/1972 | Ludwig et al. | 260/17.5 X |
| 3,686,119 | 8/1972 | Markham et al. | 260/124 A X |
| 3,759,826 | 9/1973 | Felicetta et al. | 260/124 R |
| 3,886,101 | 5/1975 | Felicetta et al. | 260/124 R |
| 3,935,139 | 1/1976 | Ashall | 260/124 R |
| 3,956,207 | 5/1976 | Blackmore et al. | 260/124 A |

OTHER PUBLICATIONS

A.B.I.P.C. 42, No. 7, 6783 (Jan. 1972).
A.B.I.P.C. 45, No. 1, 401 (Jul. 1974).

*Primary Examiner*—Thomas De Benedictis, Sr.

[57] ABSTRACT

A process for making a phenol-aldehyde resin adhesive is disclosed in which a portion of the phenol ingredient is replaced with ammonium lignosulfonate. Solid ammonia base waste sulfite liquor residue is dissolved or suspended in phenol and the mixture is heated to a temperature range of 150°–300° C under autogenous pressure until the resulting phenol-ammonium lignosulfonate component of the reaction mass is water insoluble but soluble in aqueous sodium hydroxide. The reaction mass may be washed with water to remove soluble wood sugars and their derivatives. The phenol-ammonium lignosulfonate component may then be condensed with an aldehyde resulting in a resin product that is useful as an exterior adhesive, having suitable water insolubility and adhesive characteristics. The ratio of ammonium lignosulfonate to phenol may range from 2:1 to 1:10, depending upon the desired properties of the finished adhesive.

4 Claims, No Drawings

PROCESS FOR THE PARTIAL SUBSTITUTION OF AMMONIUM LIGNOSULFONATE FOR PHENOL IN PHENOLIC-ALDEHYDE RESIN ADHESIVES

SUMMARY OF THE INVENTION

This invention describes a process in which ammonium lignosulfonate is substituted for a portion of the phenol in the production of phenol-formaldehyde type adhesives suitable for exterior applications.

BACKGROUND OF THE INVENTION

There is extensive interest in expanding the range of useful products derived from the processing of trees or other cellulosic-containing materials to improve overall yields from raw material fed into lumber and pulp processing. There are many potential products that might utilize the bark, needles, sawdust, and other waste byproducts, by incorporating them into a synthetic wallboard or insulating material. The key ingredient of most such suggested products is an adhesive that can bind together the comminuted byproducts into an integral unit having cohesive and tensile strength. Such an adhesive, because of the relatively low value of the waste material utilized and the low market price which these new products would be likely to command, must be inexpensive and derived from readily available raw materials.

The commonly used adhesives in the forest products industry are those derived from the acid or base catalyzed condensation reaction of phenol with an aldehyde, usually formaldehyde or furfural. The phenolic-formaldehyde resin is water-resistant and suitable for use in exterior plywood subject to exposure to weather.

The phenol-formaldehyde resins are not usually suitable for the production of low-value products because of their high cost, with the phenol ingredient of the resin being the expensive raw material. As a derivative of petroleum, phenol's price has risen steadily. Also, its availability as an adhesive ingredient is likely to become a problem as supplies of petroleum feed stocks decline in the future.

Spent sulfite cooking liquor, a waste material derived from the processing of cellulosic containing material into pulp, has received extensive attention as an ingredient in the search for a cheaper adhesive. Waste sulfite liquor is usually generated as a byproduct from the digestion of wood chips in an aqueous solution of a sodium, calcium, magnesium or ammonium bisulfite in the presence of an excess of sulphur dioxide. In the digestion process the cellulosic fibers are released from the matrix of lignin in which they are bound in nature. The $SO_2$ or $HSO_3^-$ ion solublizes the lignin as a salt of lignosulfonic acid, ammonium lignosulfonate, for example, if the base chemical used in cooling is ammonia. After digestion, the fibers are recovered leaving behind the spent sulfite cooking liquor. Spent sulfite liquor is a solution of 10-15 percent solids comprising the lignosulfonate as the principal constituent, simple sugars such as pentoses and hexoses as well as polysaccharides, some resin and unconsumed cooking chemicals.

Concentrated waste sulfite liquor has long been known to exhibit certain adhesive properties, perhaps partially resulting from the "sticky" gums and sugar components which may constitute up to 30 percent of the liquor solids. The use of sulfite waste liquors as adhesives has not generally been successful, however, because of the relatively low quality of bonding provided. Another major disadvantage of waste sulfite liquor-derived adhesives is their high water solubility after curing.

Goss, in U.S. Pat. Nos. 3,144,873 and 3,079,353, describes a process in which dilute sulfite liquor is heated to 180° C. to cause condensation of a portion of the sulfite liquor sugars to ammonia insoluble forms. This process improves the yield of usable sulfonate resin when the dried sulfite liquor solids are treated with anhydrous liquid ammonia to extract the remaining ammonia soluble sugars and other carbohydrate factions. The resulting desugared lignosulfonate is a water-soluble thermosetting resin which can be used to strengthen soft composition board without further treatment.

Another common approach in the search for a cheaper adhesive has been to utilize lignosulfonates as a substitute for a substantial portion of the expensive phenol component in phenol-formaldehyde resins. This substitution is based upon the common chemical properties that lignin and phenol possess. While the structure of lignin is not known with certainty, it may generally be described as a network polymer comprised of building blocks such as trans-coniferyl alcohol with free phenol-hydroxyl-groups that potentially promote attachment of formaldehyde on the aromatic ring. While phenol has the "2," "4," and "6" positions on the aromatic ring activated, however, the coniferyl component of lignin has only the "2" position free for reaction with formaldehyde. Therefore, a mixture of a lignosulfonate derived from waste sulfite liquor, phenol and an aldehyde will not incorporate a substantial portion of the lignosulfonate into a resulting polymer product because the phenol and aldehyde react rapidly while the lignosulfonate reacts very slowly. The finished product will most likely be a diluted phenol-aldehyde condensation product mixed with a portion of unreacted waste sulfite liquor.

An improved substitution of lignosulfonate for a portion of the phenol in phenol-aldehyde resin condensation products is achieved by pre-reacting the lignosulfonate with phenol prior to condensing with the aldehyde. This preliminary step involves heating the two components together for a period of time under relatively mild conditions and at a wide range of waste sulfite liquor to phenol concentrations. It has been suggested that the sulfonate components of the sulfite liquor condense with the phenol thereby producing a phenolated lignosulfonate resin with many more reactive sites available for the subsequent condensation with an active aldehyde.

In U.S. Pat. No. 2,385,586 to Rudy and Watzel, a dry, solid waste sulfite liquor is dissolved in phenol in a 1:1 molar ratio in the presence of large amounts of an anhydrous phosphoric acid catalyst. The reaction is carried out at 50°-100° C. under atmospheric pressure to yield a condensation product that is a solid resin at room temperature but readily soluble in water.

In U.S. Pat. No. 3,658,638 to Ludwig and Stout, an alkali metal lignosulfonate liquor of 35-90 weight percent solids in aqueous alkaline medium is mixed with phenol, with the lignosulfonate constituting 10-100 percent of the weight of the phenol charged. The mix is heated to the 90°-125° C. range under atmospheric pressure for 1-4 hours resulting in a phenolated lignosulfonate that is water soluble and reacts with formaldehyde to yield an exterior grade adhesive. The process requires that the lignosulfonate be an alkali metal salt and that the reaction be carried out under alkaline conditions. A reaction temperature of 180° C. or somewhat higher may be used for the more dilute solutions of waste sulfite liquor in the 35-65 percent solids range to effect reaction to the extent desired within 2-3 hours.

In U.S. Pat. Nos. 2,772,139, and 2,794,790 to Marshall et al, a waste sulfite liquor solution of 10-50 percent solids that has been decationized is reacted with phenol, in an amount up to 200 percent in excess of that which will combine, at a temperature of 100°-150° C. for up to 12 hours yielding a phenolated lignosulfonate that on condensation with an aldehyde results in a water soluble thermosetting compound which on further heating becomes insoluble in water. In U.S. Pat. No. 2,772,139 it is noted that temperatures in excess of 150° C. cause the reaction to proceed very rapidly, making control difficult.

In U.S. Pat. No. 3,227,667 issued to Moffitt, an acid-acetone extracted solution of lignin is reacted with a portion of acidified phenol by heating to 60°-110° C. The resulting water soluble condensate is then condensed with an alkalized aldehyde to give a final condensate that is soluble in the alkalized mixture but insoluble in water. It is noted that at no time is the lignin mixture exposed to a temperature above 140° C.

DESCRIPTION OF THE INVENTION

This invention is an improved process for treating a lignosulfonate derived from an ammonia base waste sulfite liquor such that the modified ammonium lignosulfonate may be readily substituted for a substantial portion of the phenol ingredient in producing a useful phenol-formaldehyde adhesive. The improved process activates the ammonium lignosulfonate such that it reacts readily with an aldehyde and forms a copolymer of the lignosulfonate-phenol-aldehyde components. The process ensures that incorporation of ammonium lignosulfonate into the resin does not incorporate undesirable water solubility into the final product.

The improved process comprises heating a dried ammonium lignosulfonate residue, derived from an ammonia base waste sulfite liquor, that has been dissolved in a polar solvent such as phenol, resorcinol, aniline or dimethylformamide to a temperature of 150°-300° C. while under autogenuous pressure. The reaction is continued until the resulting ammonium lignosulfonate-phenolic component of the reaction mass is insoluble in water but fully soluble in dilute aqueous sodium hydroxide solution. The reaction mass may, after washing with water to remove unreacted soluble sugars, then be condensed with an active aldehyde such as formaldehyde or furfural to yield a thermosetting copolymer useful as an adhesive that is soluble in dilute aqueous alkali hydroxide but insoluble in water and completely insoluble in water upon curing.

The ammonium lignosulfonate ingredient used in the described process is the residue recovered from drying to a powder the spent sulfite liquor from the ammonia based sulfite digestion of cellulosic-containing materials. The residue comprises principally ammonium lignosulfonate along with a quantity of wood sugars and their derivatives. It is generally necessary to remove these sugars, which may constitute up to 30 percent by weight of the liquor solids, from the ammonium lignosulfonates because they do not react when the sulfite liquor is treated with an aldehyde. Allowing the sugars to be incorporated into an ammonium lignosulfonate-phenol-formaldehyde resin imparts a water solubility characteristic to the resin rendering it unsuitable for many purposes. Therefore, it is a major advantage of this process that treating the waste sulfite liquor with phenol at a relatively high temperature results in a phenol-ammonium lignosulfonate product that is insoluble in water while the unreacted sugars and their derivatives retain their water soluble characteristics. A simple washing with water removes these sugars preventing their undesirable impact upon the final ammonium lignosulfonate-phenol-aldehyde condensation product.

The solvent used in the process may be any polar solvent such as phenol, resorcinol, aniline or dimethylforamide. Unreacted solvent may be removed by distillation or other means after the reaction is complete if it is necessary to the further use of the resulting resin mass. Of course, if a copolymer of ammonium lignosulfonate-phenol-formaldehyde is the desired end-product, the solvent used in the inventive process will be phenol. Excess phenol may also be recovered and recycled from the condensation process, if necessary.

The composition of the mixture charged to the process may vary considerably. Dried ammonium lignosulfonate residue in weight ratios to phenol of from 2:1 to 1:10 have been utilized successfully.

The reaction is carried out by heating the ammonium lignosulfonate residue-phenol solution to a temperature range of 150°-300° C. Most reactions are carried out at 170°-200° C. under autogenous pressure of about 75 psia for one-half to 4 hours.

Illustrative of this invention are the following examples.

EXAMPLE 1

A mixture of oven-dry ammonium lignosulfonate (75 g., Crown Zellerbach's Orzan A) and phenol (150 g) was heated at 200° C. under autogenous pressure (75 psi) for 3 hours. The black oil obtained (185 g.) did not impart any coloration to water, was slightly soluble in ethanol and methylethylketone and completely soluble in dimethylformamide and 10 percent aqueous NaOH. The product (1.5 g.) dissolved in 1.18 percent aqueous sodium hydroxide (8.5 ml) and treated with 37 percent formaldehyde solution gave a tough resinous material after heating for 4 hours on a steam bath.

EXAMPLE 2

A mixture of oven-dry ammonium lignosulfonate (100 g. Orzan A) and phenol (100 g.) was heated as described in Example 1. The product was a pourable black oil which could be condensed with alkaline formaldehyde to afford homogeneous resins which functioned as wood adhesives in standard bond tests.

EXAMPLE 3

A mixture of oven-dry ammonium lignosulfonate (640 g.) and phenol (320 g.) was heated as described in Example 1. When the reactor was opened, an odor of hydrogen sulfide was apparent and there was a yellow deposit of sulfur in the upper parts of the chamber. The product was a viscous black semi-solid which could be condensed with alkaline formaldehyde to afford homogeneous resins which functioned as wood adhesives in standard bond tests.

The reaction is not operative by simple heating of an ammonium lignin sulfonate as illustrated by the following experiment.

EXAMPLE 4

A mixture of oven-dry ammonium lignosulfonate (100 g.) and an aerogenic silica (15 g. Cabot Corporation's Cab-O-Sil) was heated at 200° C. for 2 hours. The product was a black powder, insoluble in water and only partly soluble (16 percent) in 10 percent aqueous sodium hydroxide even after refluxing for 6 hours.

After the period of reaction the solution of the ammonium lignosulfonate derived material in the phenol may be used directly in the preparation of typical phenol-formaldehyde resins intended for use in wood adhesives. These preparations are well known and involve the condensation of the phenol ammonium lignosulfonate reaction mass with formaldehyde and sodium hydroxide. The following example illustrates these reactions:

EXAMPLE 5

The ammonium lignosulfonate-phenol reaction mass (50 g.), water (45.8 g.), formaldehyde (46.1 percent, 70.7 g.) and sodium hydroxide (50 percent, 13.6 g.) were refluxed at 100° C. for 7.33 hours. The mixture was then treated with additional sodium hydroxide (50 percent, 9 g.) and heating was continued for 1.5 hours more. The free formaldehyde content of the resin had dropped to 5.4 percent and the viscosity was 2,700 cps. The stroke cure time of this resin at 100° C. was 20 seconds. In a standard bond test after press times of 7, 8, 9, 10 and 11 minutes the force necessary to separate the adherends were 0, 0.1, 0.6, 1.3 and 2.2 pounds.

If the ammonium lignosulfonate residue is heated with a polar solvent other than phenol it may be necessary to remove excess solvent by distillation or other means prior to reaction with an aldehyde. Of course, after such removal, the activated ammonium lignosulfonate residue may be reacted with a phenol and an aldehyde mixture depending upon the desired characteristics of the final product. The extracted solvent may be recycled to the initial heating process.

It will be clear that after the ammonium lignosulfonate residue is reacted with the phenol, the reaction mass may be washed with water to remove unreacted water-soluble sugars to yield the purified ammonium lignosulfonate-phenolic component suitable for making aldehyde condensation products of desirable water insolubility characteristics.

It will also be clear that the reaction of the ammonium ligno-sulfonate with the phenol could be carried out in a continuous reactor by pumping the liquid mixture of the two ingredients through a hot tube reactor.

What is claimed is:

1. A process for making a phenol-formaldehyde adhesive in which ammonium lignosulfonate is substituted for a portion of the phenol ingredient, which consists essentially of the steps of:

dissolving a dry residue of ammonia base waste sulfite liquor containing ammonium lignosulfonate in phenol in weight ratios of residue to solvent of 2:1 to 1:10 to form a lignosulfonate reaction solution;

heating said reaction solution under autogenous pressure at elevated temperature until a reaction mass forms, the lignosulfonate containing portion of which is substantially water insoluble but is soluble in a dilute aqueous solution of an alkali metal hydroxide; and condensing said reaction mass with a portion of formaldehyde in the presence of an aqueous alkali metal hydroxide until a thermosettable resin is formed.

2. The process of claim 1 in which the lignosulfonate reaction is heated to a temperature in the range of 150°–300° C.

3. The process of claim 1 in which the ratio of residue to solvent is in the range of 2:1 to 1:2.

4. The product formed by the process of claim 1.